United States Patent
Howard (10) Patent No.: US 11,341,482 B2
(45) Date of Patent: May 24, 2022

(54) AUTOMATIC ACCOUNT IDENTIFIER DETECTION AND AUTHORIZATION

(71) Applicant: Visa International Service Association, San Francisco, CA (US)

(72) Inventor: Kelvan Patrick Howard, San Francisco, CA (US)

(73) Assignee: Visa International Service Association, San Francisco, CA (US)

( * ) Notice: Subject to any disclaimer, the term of this patent is extended or adjusted under 35 U.S.C. 154(b) by 333 days.

(21) Appl. No.: 16/548,991

(22) Filed: Aug. 23, 2019

(65) Prior Publication Data

US 2021/0056538 A1 Feb. 25, 2021

(51) Int. Cl.
*G06Q 20/00* (2012.01)
*G06Q 20/36* (2012.01)
*H04W 4/021* (2018.01)

(52) U.S. Cl.
CPC ..... *G06Q 20/3674* (2013.01); *G06Q 20/3678* (2013.01); *H04W 4/021* (2013.01)

(58) Field of Classification Search
CPC .......... G06Q 20/3674; G06Q 20/3678; H04W 4/021

USPC .......... 705/16, 21, 59; 380/44, 262
See application file for complete search history.

(56) References Cited

U.S. PATENT DOCUMENTS

| | | | |
|---|---|---|---|
| 8,386,349 B2 | 2/2013 | Dixon et al. | |
| 2008/0228648 A1 | 9/2008 | Kemper et al. | |
| 2014/0379580 A1 | 12/2014 | Varma et al. | |
| 2015/0160019 A1* | 6/2015 | Biswal | B60W 50/00 701/1 |
| 2015/0350174 A1* | 12/2015 | Reno | H04L 67/10 726/3 |

* cited by examiner

*Primary Examiner* — Dante Ravetti
(74) *Attorney, Agent, or Firm* — The Webb Law Firm (57) ABSTRACT

Provided are systems, methods, techniques, instruction sequences, and computer program products associated with and configured to the technical field of special purpose machines that facilitate generation and provision of application program interfaces (or APIs). The APIs automatically compare the geographic position of a user resource with a known database of events to determine the likelihood that the user is attending the event. In response to determining that the likelihood exceeds a predetermined limit, the APIs communicate notifications to update user information to service providers, such as financial networks, to improve the performance of the user's portable financial devices and reduce financial fraud associated with offline transactions.

20 Claims, 2 Drawing Sheets

AUTOMATIC ACCOUNT IDENTIFIER DETECTION AND AUTHORIZATION

BACKGROUND

1. Technical Field

The present disclosure relates to systems, methods, techniques, instruction sequences, and computer program products associated with and configured to the technical field of special purpose machines that facilitate generation and provision of application program interfaces (or APIs), including APIs that communicate notifications to update user information to service providers, such as financial networks to improve the performance of the user's portable financial devices and reduce financial fraud associated with offline transactions.

2. Technical Considerations

During events attended by large numbers of people (e.g., large sporting events, concerts, music festivals, etc.) where consumers and merchants often lose internet connectivity, financial transactions are held in a queue while the merchant is off-line and then sent to the issuer of the portable financial device or financial network once the connectivity returns. The period of queueing transactions may last for hours depending on the nature of the event. During this time, the merchant assumes the risk for any fraud and for transactions that an issuer or card network would otherwise have declined if the merchant had access to network connectivity. During this delay, the consumer may have consumed the good or departed the area in which the transaction occurred. Consequently, the loss of connectivity can result in substantial financial losses for a merchant. Additionally, knowledge that off-line transactions are queued for later processing may lead consumers to utilize portable financial devices that have insufficient funds associated with the financial device, resulting in a dramatic increase in financial fraud. As a result, portable financial device issuers and payment networks expend substantial resources on efforts to reduce the fraud associated with unauthorized transactions that occur during periods of limited or no connectivity.

Therefore, there is a need in the art for an improved way of anticipating periods of reduced connectivity, pre-authorizing transactions, and implementing transaction limits for portable financial devices during events associated with diminished connectivity.

SUMMARY

In some non-limiting embodiments or aspects, the present disclosure is directed to a method that includes inferring, by a computing system, based on information associated with a user of a user resource, the location of the user resource and comparing that location to at least one known event included in a database of events occurring within a pre-determined geographic region comprising the location of the user resource. According to some non-limiting embodiments or aspects, provided are a computer implemented method, system, and computer program product for determining the location of a user resource, correlating the user resource with a database of events, determining the likelihood that the user is attending an event associated with the database of events, and, if the likelihood exceeds a pre-determined value, authorizing a service provider to modify at least one feature of at least one user account associated with the service provider.

In some non-limiting embodiments or aspects, the modified features may relate to limits on the number of transactions a user can conduct, the transaction amounts, merchants with whom the user may transact, the geography in which the user may transact, or the types of products that a user may purchase.

According to some non-limiting embodiments or aspects, provided is a computer-implemented method comprising: determining, with at least one processor, a current geographic position of a user resource associated with a user; accessing, with at least one processor, event data from a database of events correlated with a predetermined geographic region and a pre-determined period of time, wherein the geographic region comprises the current geographic position of the user resource; correlating, with at least one processor, the current geographic position of the user resource to the event data and the period of time; calculating, with at least one processor, using the correlated geographic position of the user resource, the event data, and the period of time, a likelihood that the user is attending at least one event associated with the event data; in response to calculating that the likelihood exceeds a pre-determined limit, constructing, with at least one processor, at least one API request, the at least one API request pre-authorizing at least one transaction or an aggregate transaction amount during the time period associated with the at least one event; transmitting, with at least one processor, the at least one API request to a service provider server; and, in response to the transmitting, receiving, with at least one processor, at least one message from the service provider server, the at least one message comprising an authorization request to update at least one feature of at least one user account associated with the service provider.

In some non-limiting embodiments or aspects, the API request pre-authorizing at least one transaction comprises updating the service provider server to set at least one transaction amount limit on the at least one transaction during the time period associated with the at least one event.

In some non-limiting embodiments or aspects, the at least one message comprising the authorization request to update at least one feature of at least one user account associated with the service provider comprises programming a digital wallet associated with the user account not to exceed the at least one transaction amount limit during the time period associated with the at least one event.

In some non-limiting embodiments or aspects, the transaction amount limits are correlated with the at least one event associated with the event data.

In some non-limiting embodiments or aspects, the API request pre-authorizing an aggregate transaction amount comprises updating the service provider server to set limits on the number of transactions associated with the aggregate transaction amount during the time period associated with the at least one event.

In some non-limiting embodiments or aspects, the at least one message comprising the authorization request to update at least one feature of at least one user account associated with the service provider comprises programming a digital wallet associated with the user account not to exceed the number of transactions associated with the aggregate transaction amount during the time period associated with the at least one event.

In some non-limiting embodiments or aspects, the number of transactions associated with the aggregate transaction amount is correlated with the at least one event associated with the event data.

Additionally, according to some non-limiting embodiments or aspects, provided is a computer program product storing instructions that, when executed by one or more processors, cause the one or more processors to perform operations comprising: determining, with at least one processor, a current geographic position of a user resource associated with a user; accessing, with at least one processor, event data from a database of events correlated with a pre-determined geographic region and a predetermined period of time, wherein the geographic region comprises the current geographic position of the user resource; correlating, with at least one processor, the current geographic position of the user resource to the event data and the period of time; calculating, with at least one processor, using the correlated geographic position of the user resource, the event data, and the period of time, a likelihood that the user is attending at least one event associated with the event data; in response to calculating that the likelihood exceeds a pre-determined limit, constructing, with at least one processor, at least one API request, the at least one API request pre-authorizing at least one transaction or an aggregate transaction amount during the time period associated with the at least one event; transmitting, with at least one processor, the at least one API request to a service provider server; and, in response to the transmitting, receiving, with at least one processor, at least one message from the service provider server, the at least one message comprising an authorization request to update at least one feature of at least one user account associated with the service provider.

In some non-limiting embodiments or aspects, the API request pre-authorizing at least one transaction comprises updating the service provider server to set at least one transaction amount limit on the at least one transaction during the time period associated with the at least one event.

In some non-limiting embodiments or aspects, the at least one message comprising the authorization request to update at least one feature of at least one user account associated with the service provider comprises programming a digital wallet associated with the user account not to exceed the at least one transaction amount limit during the time period associated with the at least one event.

In some non-limiting embodiments or aspects, the transaction amount limits are correlated with the at least one event associated with the event data.

In some non-limiting embodiments or aspects, the API request pre-authorizing an aggregate transaction amount comprises updating the service provider server to set limits on the number of transactions associated with the aggregate transaction amount during the time period associated with the at least one event.

In some non-limiting embodiments or aspects, the at least one message comprising the authorization request to update at least one feature of at least one user account associated with the service provider comprises programming a digital wallet associated with the user account not to exceed the number of transactions associated with the aggregate transaction amount during the time period associated with the at least one event.

In some non-limiting embodiments or aspects, the number of transactions associated with the aggregate transaction amount is correlated with the at least one event associated with the event data.

According to some non-limiting embodiments or aspects, provided is a system, comprising one or more hardware processors, and a storage device storing instructions that, when executed by the one or more hardware processors, causes the one or more hardware processors to perform operations comprising: determining, with at least one processor, a current geographic position of a user resource associated with a user; accessing, with at least one processor, event data from a database of events correlated with a pre-determined geographic region and a pre-determined period of time, wherein the geographic region comprises the current geographic position of the user resource; correlating, with at least one processor, the current geographic position of the user resource to the event data and the period of time; calculating, with at least one processor, using the correlated geographic position of the user resource, the event data, and the period of time, a likelihood that the user is attending at least one event associated with the event data; in response to calculating that the likelihood exceeds a pre-determined limit, constructing, with at least one processor, at least one API request, the at least one API request pre-authorizing at least one transaction or an aggregate transaction amount during the time period associated with the at least one event; transmitting, with at least one processor, the at least one API request to a service provider server; and, in response to the transmitting, receiving, with at least one processor, at least one message from the service provider server, the at least one message comprising an authorization request to update at least one feature of at least one user account associated with the service provider.

In some non-limiting embodiments or aspects, the API request pre-authorizing at least one transaction comprises updating the service provider server to set at least one transaction amount limit on the at least one transaction during the time period associated with the at least one event.

In some non-limiting embodiments or aspects, the at least one message comprising the authorization request to update at least one feature of at least one user account associated with the service provider comprises programming a digital wallet associated with the user account not to exceed the at least one transaction amount limit during the time period associated with the at least one event.

In some non-limiting embodiments or aspects, the transaction amount limits are correlated with the at least one event associated with the event data.

In further non-limiting embodiments or aspects, the API request pre-authorizing an aggregate transaction amount comprises updating the service provider server to set limits on the number of transactions associated with the aggregate transaction amount during the time period associated with the at least one event.

In some non-limiting embodiments or aspects, the at least one message comprising the authorization request to update at least one feature of at least one user account associated with the service provider comprises programming a digital wallet associated with the user account not to exceed the number of transactions associated with the aggregate transaction amount during the time period associated with the at least one event.

In some non-limiting embodiments or aspects, the number of transactions associated with the aggregate transaction amount is correlated with the at least one event associated with the event data.

Further non-limiting embodiments or aspects are set forth in the following numbered clauses:

Clause 1. A computer-implemented method for automatically detecting a potential loss in connectivity and automatically updating at least one feature of a user account, comprising: determining, with at least one processor, a current geographic position of a user resource associated with a user; accessing, with at least one processor, event data from a database of events correlated with a pre-determined geographic region and a pre-determined period of time, wherein the geographic region comprises the current geographic position of the user resource; correlating, with at least one processor, the current geographic position of the user resource to the event data and the period of time; calculating, with at least one processor, using the correlated geographic position of the user resource, the event data, and the period of time, a likelihood that the user is attending at least one event associated with the event data; in response to calculating that the likelihood exceeds a pre-determined limit, constructing, with at least one processor, at least one API request, the at least one API request pre-authorizing at least one transaction or an aggregate transaction amount during the time period associated with the at least one event; transmitting, with at least one processor, the at least one API request to a service provider server; and, in response to the transmitting, receiving, with at least one processor, at least one message from the service provider server, the at least one message comprising an authorization request to update at least one feature of at least one user account associated with the service provider.

Clause 2. The computer-implemented method of Clause 1, wherein the API request pre-authorizing at least one transaction comprises updating the service provider server to set at least one transaction amount limit on the at least one transaction during the time period associated with the at least one event.

Clause 3. The computer-implemented method of Clause 1 or 2, wherein the at least one message comprising the authorization request to update at least one feature of at least one user account associated with the service provider comprises programming a digital wallet associated with the user account not to exceed the at least one transaction amount limit during the time period associated with the at least one event.

Clause 4. The computer-implemented method of any of Clauses 1-3, wherein the transaction amount limits are correlated with the at least one event associated with the event data.

Clause 5. The computer-implemented method of any of Clauses 1-4, wherein the API request pre-authorizing an aggregate transaction amount comprises updating the service provider server to set limits on the number of transactions associated with the aggregate transaction amount during the time period associated with the at least one event.

Clause 6. The computer-implemented method of any of Clauses 1-5, wherein the at least one message comprising the authorization request to update at least one feature of at least one user account associated with the service provider comprises programming a digital wallet associated with the user account not to exceed the number of transactions associated with the aggregate transaction amount during the time period associated with the at least one event.

Clause 7. The computer-implemented method of any of Clauses 1-6, wherein the number of transactions associated with the aggregate transaction amount is correlated with the at least one event associated with the event data.

Clause 8. A computer program product storing instructions that, when executed by one or more processors, cause the one or more processors to perform operations comprising: determining, with at least one processor, a current geographic position of a user resource associated with a user; accessing, with at least one processor, event data from a database of events correlated with a pre-determined geographic region and a predetermined period of time, wherein the geographic region comprises the current geographic position of the user resource; correlating, with at least one processor, the current geographic position of the user resource to the event data and the period of time; calculating, with at least one processor, using the correlated geographic position of the user resource, the event data, and the period of time, a likelihood that the user is attending at least one event associated with the event data; in response to calculating that the likelihood exceeds a pre-determined limit, constructing, with at least one processor, at least one API request, the at least one API request pre-authorizing at least one transaction or an aggregate transaction amount during the time period associated with the at least one event; transmitting, with at least one processor, the at least one API request to a service provider server; and, in response to the transmitting, receiving, with at least one processor, at least one message from the service provider server, the at least one message comprising an authorization request to update at least one feature of at least one user account associated with the service provider.

Clause 9. The computer program product of Clause 8, wherein the API request pre-authorizing at least one transaction comprises updating the service provider server to set at least one transaction amount limit on the at least one transaction during the time period associated with the at least one event.

Clause 10. The computer program product of Clause 8 or 9, wherein the at least one message comprising the authorization request to update at least one feature of at least one user account associated with the service provider comprises programming a digital wallet associated with the user account not to exceed the at least one transaction amount limit during the time period associated with the at least one event.

Clause 11. The computer program product of any of Clauses 8-10, wherein the transaction amount limits are correlated with the at least one event associated with the event data.

Clause 12. The computer program product of any of Clauses 8-11, wherein the API request pre-authorizing an aggregate transaction amount comprises updating the service provider server to set limits on the number of transactions associated with the aggregate transaction amount during the time period associated with the at least one event.

Clause 13. The computer program product of any of Clauses 8-12, wherein the at least one message comprising the authorization request to update at least one feature of at least one user account associated with the service provider comprises programming a digital wallet associated with the user account not to exceed the number of transactions associated with the aggregate transaction amount during the time period associated with the at least one event.

Clause 14. The computer program product of any of Clauses 8-13, wherein the number of transactions associated with the aggregate transaction amount is correlated with the at least one event associated with the event data.

Clause 15. A system comprising: one or more hardware processors; and a storage device storing instructions that, when executed by the one or more hardware processors, causes the one or more hardware processors to perform operations comprising: determining, with at least one processor, a current geographic position of a user resource associated with a user; accessing, with at least one processor, event data from a database of events correlated with a pre-determined geographic region and a predetermined period of time, wherein the geographic region comprises the current geographic position of the user resource; correlating, with at least one processor, the current geographic position of the user resource to the event data and the period of time;

calculating, with at least one processor, using the correlated geographic position of the user resource, the event data, and the period of time, a likelihood that the user is attending at least one event associated with the event data; in response to calculating that the likelihood exceeds a pre-determined limit, constructing, with at least one processor, at least one API request, the at least one API request pre-authorizing at least one transaction or an aggregate transaction amount during the time period associated with the at least one event; transmitting, with at least one processor, the at least one API request to a service provider server; and, in response to the transmitting, receiving, with at least one processor, at least one message from the service provider server, the at least one message comprising an authorization request to update at least one feature of at least one user account associated with the service provider.

Clause 16. The system of Clause 15, wherein the API request pre-authorizing at least one transaction comprises updating the service provider server to set at least one transaction amount limit on the at least one transaction during the time period associated with the at least one event.

Clause 17. The system of Clause 15 or 16, wherein the at least one message comprising the authorization request to update at least one feature of at least one user account associated with the service provider comprises programming a digital wallet associated with the user account not to exceed the at least one transaction amount limit during the time period associated with the at least one event.

Clause 18. The system of any of Clauses 15-17, wherein the transaction amount limits are correlated with the at least one event associated with the event data.

Clause 19. The system of any of Clauses 15-18, wherein the API request preauthorizing an aggregate transaction amount comprises updating the service provider server to set limits on the number of transactions associated with the aggregate transaction amount during the time period associated with the at least one event.

Clause 20. The system of any of Clauses 15-19, wherein the at least one message comprising the authorization request to update at least one feature of at least one user account associated with the service provider comprises programming a digital wallet associated with the user account not to exceed the number of transactions associated with the aggregate transaction amount during the time period associated with the at least one event.

Clause 21. The system of any of Clauses 15-20, wherein the number of transactions associated with the aggregate transaction amount is correlated with the at least one event associated with the event data.

BRIEF DESCRIPTION OF THE DRAWINGS

The above and other aspects, features, and advantages of the present disclosure are illustrated by way of example and not limitation in the following detailed description taken in conjunction with the accompanying drawings.

DETAILED DESCRIPTION

Hereinafter, embodiments of the present disclosure will be described with reference to the accompanying drawings; however, it should be understood that there is no intent to limit the present disclosure to the particular forms or examples disclosed herein. The specific details set forth are illustrative only and provide an understanding of various examples of the present subject matter. The present disclosure should be construed to cover various modifications, equivalents, and/or alternatives of the present disclosure's examples with the examples merely typifying possible variations. Unless explicitly stated otherwise, the structural elements described in the present disclosure are optional and may be combined or subdivided, and operations may vary in sequence or be combined or subdivided.

Definitions

As used herein, the expressions "comprise," "may comprise," "have," "may have," "include," and "may include" refer to the existence of a corresponding feature, such as a numeral, function, operation, or constituent element (such as a component) and do not exclude one or more additional features.

The "user resource," according to the examples of the present disclosure, may include at least one of, for example, a mobile device, a smart phone, a feature phone, a tablet personal computer, a video phone, an electronic book (e-book) reader, a desktop PC, a laptop PC, a netbook computer, a workstation, a server, a personal digital assistant (PDA), a portable multi-media player, a wearable device, a smart watch, a connected ring, a connected bracelet, connected glasses, connected contact lenses, a virtual reality device, head-mounted device, a fabric integrated with an electronic chip or internet connectivity, a mobile medical device or some type of biophysical modification such as connected tattoo or bio-implant. According to some examples, the user resource may be a connected home appliance or a connected vehicle. The connected home appliance may include at least one of a television, a digital home assistant, a refrigerator, a vacuum cleaner, a microwave oven, a set-top box, a gaming console, or an electronic key. According to some examples, the user resource may include connected furniture or a connected building/structure. The user resource is not limited to the aforementioned devices and may include a future device according the development of technology.

No aspect, component, element, structure, act, step, function, instruction, and/or the like used herein should be construed as critical or essential unless explicitly described as such. Also, as used herein, the articles "a" and "an" are intended to include one or more items, and may be used interchangeably with "one or more" and "at least one." Furthermore, as used herein, the term "set" is intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the terms "communication" and "communicate" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and communicates the processed information to the second unit. In some non-limiting embodiments or aspects, a message may refer to a network packet (e.g., a data packet and/or the like) that includes data. It will be appreciated that numerous other arrangements are possible.

As used herein, the term "account identifier" may refer to one or more types of identifiers associated with a user account (e.g., an account identifier, a primary account number (PAN), a card number, a payment card number, a token, and/or the like). In some non-limiting embodiments or aspects, an issuer institution may provide an account identifier (e.g., a PAN, a token, and/or the like) to a user that uniquely identifies one or more accounts associated with that user. The account identifier may be embodied on a physical financial instrument (e.g., a portable financial instrument, a payment card, a credit card, a debit card, and/or the like) and/or may be electronic information communicated to the user that the user may use for electronic payment transactions. In some non-limiting embodiments or aspects, the account identifier may be an original account identifier, where the original account identifier was provided to a user at the creation of the account associated with the account identifier. In some non-limiting embodiments or aspects, the account identifier may be an account identifier (e.g., a supplemental account identifier) that is provided to a user after the original account identifier was provided to the user. In some non-limiting embodiments or aspects, the account identifier may be an original account identifier as chosen by or entered by a user at the creation of the account associated with the identifier (e.g., a username). For example, if the original account identifier is forgotten, stolen, and/or the like, a supplemental account identifier may be provided to the user. In some non-limiting embodiments or aspects, an account identifier may be directly or indirectly associated with an issuer institution such that an account identifier may be a token that maps to a PAN or other type of identifier. Account identifiers may be alphanumeric, any combination of characters and/or symbols, and/or the like.

As used herein, the term "server" or "processor" may refer to one or more computing machines, such as processors, storage devices, and/or similar computer components that communicate with client devices and/or other computing machines over a network, such as the Internet or private networks, and, in some examples, facilitate communication among other servers and/or client devices. It will be appreciated that various other arrangements are possible. As used herein, the term "system" may refer to one or more computing machines or combinations of computing machines such as, but not limited to, processors, servers, client devices, software applications, and/or other like components. In addition, reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

As used herein, the term "computing machine" may refer to one or more computing devices or electronic devices that are configured to directly or indirectly communicate with or over one or more networks. The computing machine may be a mobile device. As an example, a mobile device may include a cellular phone (e.g., a smartphone or standard cellular phone), a portable computer, a wearable device (e.g., watches, glasses, lenses, clothing, and/or the like), a PDA, and/or other like devices. The computing machine may not be a mobile device, such as a desktop computer. Furthermore, the term "computer" may refer to any computing machine that includes the necessary components to receive, process, and output data, and normally includes a display, a processor, a memory, an input device, and a network interface. An "application" or "application program interface" (API) refers to computer code or other data sorted on a computer-readable medium that may be executed by a processor to facilitate the interaction between software components, such as a client-side front-end and/or server-side back-end for receiving data from the client. An "interface" refers to a generated display, such as one or more graphical user interfaces (GUIs) with which a user may interact, either directly or indirectly (e.g., through a keyboard, mouse, etc.).

Example systems, methods, techniques, computer program products, instruction sequences, and computing machine program products facilitate automatically determining user geolocation data to allow a user to authorize an update to a service provided by a service provider to the user. Example systems (e.g., special-purpose machines) are configured to access a user resource comprising a user's geolocation data that includes the user's geographic data and the user's calendar data. Some non-limiting embodiments or aspects provide mechanisms and logic that are capable of accessing the location services of a user resource to determine a user's geographic data as a function of time.

Figure 1:
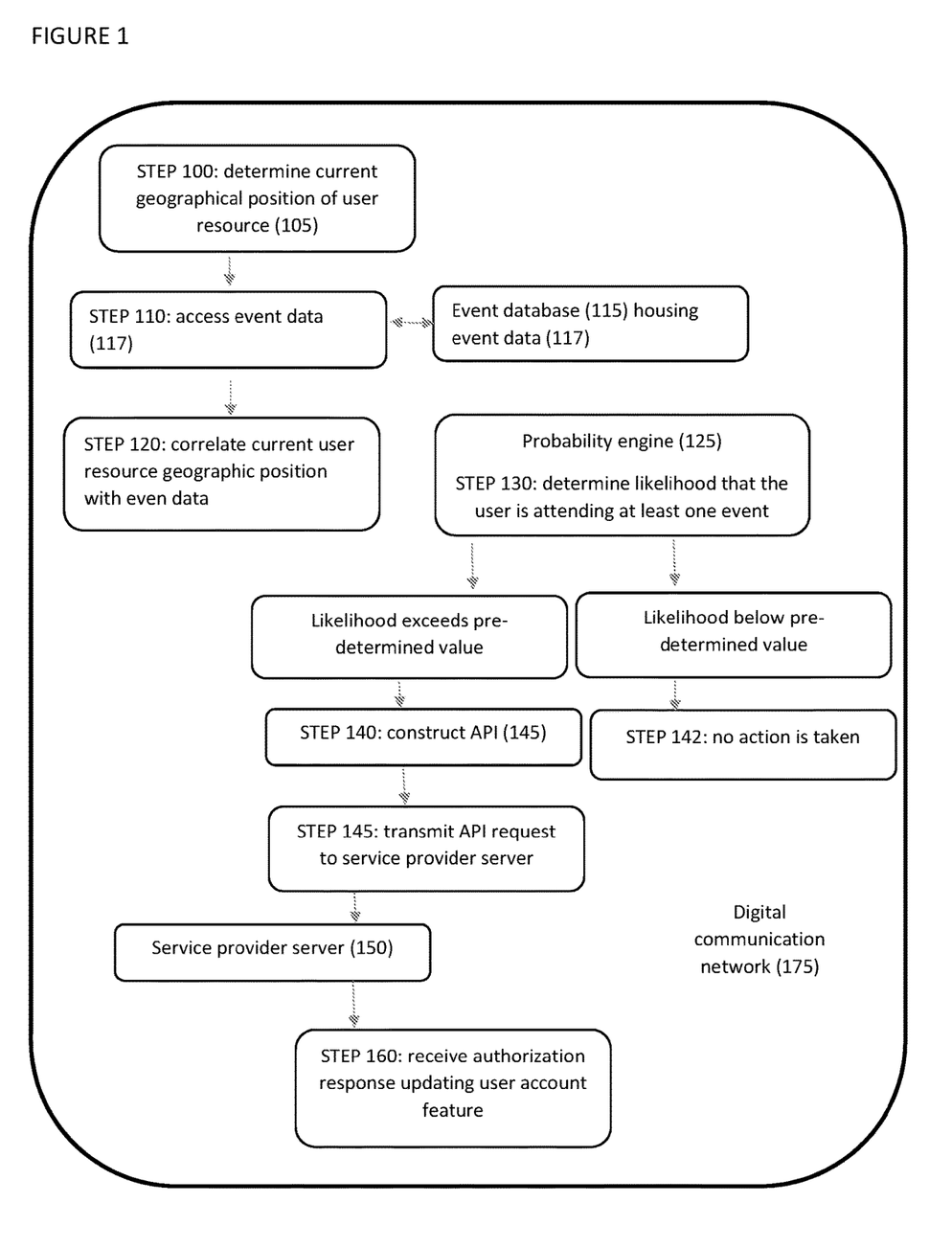
FIG. 1 is a diagram of a non-limiting embodiment or aspect of an environment that illustrates a digital communication network comprising data associated with a user resource, an event database, and a service provider server according to some non-limiting embodiments or aspects.

In some non-limiting embodiments or aspects, and as shown in FIG. 1, a user resource is used to determine (Step 100) the current geographic position of a user resource 105. In some non-limiting embodiments or aspects, the current geographic position of a user resource 105 may comprise information related to country of location, state of location, city of location, GPS data and chronological data capturing the location of the user resource 105 at a specific time or series of times. Additionally, some non-limiting embodiments or aspects provide mechanisms and logic that are capable of calculating a general area of location for the user resource 105 in instances where the user resource 105 may not be statically located. In some non-limiting embodiments or aspects, the user resource 105 may have been associated with a specific user or a group of users by linking the user resource device ID to an account identifier associated with a particular user or group of users. Additionally, in some non-limiting embodiments or aspects, the user resource 105 may have been associated with a specific user or a group of users by downloading internet cookies to the user resource 105 after the user of the user resource 105 accessed an internet service, web page, web link, or other suitable service provided by a service provider associated with a user account characterized by an account identifier. Additionally, in further non-limiting embodiments or aspects, the user resource 105 may have been associated with a specific user or a group of users by placing a token associated with the user resource device ID and account identifier on the user resource 105. The user resource 105 may be associated with a user in any suitable method that allows the user, user resource 105, or a service provider to identify an account identifier associated with the user.

In some non-limiting embodiments or aspects, an event database 115 may be accessed (Step 110) to determine event data 117. The accessing of the event data (Step 110) after determining, using at least one processor, the current geographic position of the user resource (Step 100) allows correlation (Step 120) of the current user resource geographic position with the event data 117 to determine the likelihood that the user is attending at least one event associated with the event data. In some non-limiting embodiments or aspects, the correlation may comprise determining that the current geographic position of the user resource coincides with at least one event comprised by the event data. In some non-limiting embodiments or aspects, determining that the current geographic position of the user resource coincides with an event comprised by the event data may indicate that the user resource and the event co-exist in the same neighborhood, city, state, or geographic area for a given time. Accessing of the event data (Step 110) may comprise sending an information request to a server upon which the database resides, constructing and transmitting and API call to a server, or receiving regular, periodic updates comprising event data from the server upon which the events database resides.

In some non-limiting embodiments or aspects, the degree of correlation determined by correlating the current geographic position of the user resource with the event data (Step 120) for a given time may be a factor in determining the likelihood that the user is attending at least one event comprised by the event data (Step 130). In some non-limiting embodiments or aspects, the correlation may be determined by a probability engine 125 that comprises information on the user that may be used in the determination of the likelihood. In addition to correlations between the current geographic position of the user resource and the event data, the probability engine 125 may use additional parameters to determine the likelihood that a user is attending at least one event associated with the event data. In some non-limiting embodiments or aspects, the additional parameters may comprise statistical analyses, predictions based on a user's transaction patterns and past spending, a user's past travel patterns, the trajectory of travel of the user resource, or any other relevant factor. In some non-limiting embodiments or aspects, an additional parameter may include the purchase of a flight to the city in which at least one event associated with the event data is occurring. In some non-limiting embodiments or aspects, the additional parameters may include the purchase of lodging (e.g., a hotel or Airbnb®) in the general geographic area in which at least one event associated with the event data is occurring. In some non-limiting embodiments or aspects, the additional parameters may include information posted on a publicly accessible forum (e.g., social media) indicating that the user plans to attend at least one event associated with the event data. In some non-limiting embodiments or aspects, the information posted on a publicly accessible forum may be scoured using machine learning, AI, or computer code in the form of a bot that has the ability to crawl the web to find social media information associated with a particular user or a group of users. In some non-limiting embodiments or aspects, information posted on a publicly accessible forum may be accessed after the user consents to the placement of cookies in the internet browser of a user resource or a token on the user resource that allows user access of the public forums containing information regarding the user's plans to attend at least one event.

In some non-limiting embodiments or aspects, if the determined likelihood does not exceed a pre-determined value, then no action may be taken (Step 142). In some non-limiting embodiments or aspects, if the determined likelihood exceeds a predetermined value, in response to calculating the likelihood, at least one or API (e.g., an API call) request is constructed utilizing at least one processor (Step 140). The predetermined value that the likelihood exceeds may be static or dynamic, dependent on an individual, a group to which the individual belongs, or a geographical region. In some non-limiting embodiments or aspects, the predetermined value is dynamically determined based on a user's credit score, financial history, or banking information. For example, the lower the user's credit score or the shorter the length of time associated with the user's financial history, the lower the probability limit required to pre-authorize a transaction; the higher the user's credit score or the longer the length of the user's financial history, the higher the probability limit. In some non-limiting embodiments or aspects, a predetermined likelihood of 25% is calculated for a user with a limited financial history, such that if there is a 25% chance or higher that the user will attend an event, off-line transaction limits will be automatically pre-authorized for the user using the disclosed method, computer product, or system. For a user with an established financial history, a pre-determined likelihood of 90% may be required to set transaction limits for the user's off-line transactions (due to the fact that the user with the longer financial history is deemed a lower risk).

In some non-limiting embodiments or aspects, the at least one API request comprises information pre-authorizing at least one transaction or an aggregate transaction amount during the time associated with the at least one event. The amount associated with the pre-authorized at least one transaction or the number of transactions associated with the aggregate transaction amount may be based on a user's credit score, annual income, spending history over a limited period of time, spending history over the life-time of a particular user account, the type of event, the length of the event, the type of transaction, or any other relevant factor. In some non-limiting embodiments or aspects where the event is a concert, the transaction amount limits may be $50.00 USD and the total number of aggregate transactions may be five transactions since an average user will likely visit the concession stand fewer than five times and will likely spend less than $50. In some non-limiting embodiments or aspects where the event is a three-day music festival, the transaction amount limit may be adjusted to $200.00 USD to reflect the nature of the event or the average spend per transaction of the event, and the total number of aggregate transactions may be increased to 15 to allow up to five transactions per day. In some non-limiting embodiments or aspects where the event is a luxury cruise where the average purchase price may be higher than the average purchase price of a concert, the transaction limits may be adjusted accordingly. Additionally, in some non-limiting embodiments or aspects, the transaction amount limits and the total number of aggregate transactions may be fixed or adjusted dynamically. In the non-limiting embodiments where the limits are fixed, the limits may be set in advance of the event or during the event by the user, an associate of the user, an issuer of a user account, the user account acquirer (in the case where the user account is associated with a portable financial device), a credit card network, a merchant, someone associated with the user of the user account (e.g., a parent or a spouse), or any other relevant party.

The time associated with the at least one event may be determined by the user of the user resource, the service provider, an issuer of a user account, the user account acquirer (in the case where the user account is associated with a portable financial device), a credit card network, a merchant, an individual associated with the user of the user account, or any other relevant party in advance of the event or during the event. The time associated with the at least one event may comprise the start and expected termination time of the event, or windows of time in advance of the start or beyond the expected termination of the event. In some non-limiting embodiments or aspects where the at least one event associated with the event data comprises a concert, the time associated with the event may comprise the start and end time of the concert. In an additional embodiment or aspect, the time associated with the concert may comprise one hour before the planned start of the concert and one hour beyond the end of the concert.

After construction of at least one API request (Step 140), the at least one API request is transmitted (Step 145) to a service provider server 150 utilizing a digital communications network 175. The at least one API requests may be transmitted to the server(s) of at least one service provider simultaneously, sequentially, in batches, or in any manner that allows transmission of the API requests. In some non-limiting embodiments or aspects, the user resource 105 may transmit the API requests or share the constructed API requests with at least one other user resource (in this exemplary embodiment, a second user resource) associated with the same user, such that the at least one other user resource may transmit the API requests to the service provider server 150. For example, the user resource 105 may comprise a user's smart watch, which may not have full Internet connectivity, but may be tethered, using Bluetooth® or Wi-Fi®, to a user's connected user resource (e.g., a mobile phone). In the instant example, the user's smart watch may construct, using one or more processors, the at least one API request and then share the requests with the user's mobile phone via their shared connection such that the user's mobile phone is configured to transmit the API requests to the service provider server 150 via the digital communication network 175.

In some non-limiting embodiments or aspects, in response to transmitting the at least one API request (Step 145), at least one message from the service provider server (Step 160) is received. In some non-limiting embodiments or aspects, the at least one message comprises an authorization request to update at least one feature of at least one user account associated with the service provider. The feature may comprise the frequency of use of a portable financial device, transaction amount, total number of aggregate transactions allowed during a specified time period, limitations on the merchants or merchant categories where a financial portable device may be used, geographical limitations, limitations on the time of day in which a user account may be used, limitations on the types of products that may be used with a user account or portable financial device, or any combinations thereof. In one further non-limiting embodiment of aspect, the feature may comprise specific limitations on the use on the portable financial device. In one non-limiting aspect or aspect, the authorization request to update at least one feature of at least one user account may comprise programing instructing a digital wallet residing on a user resource and associated with the user account to implement the requested changes to the user account. In some non-limiting embodiments or aspects, the authorization request to update at least one feature of at least one user account may comprise features that were created by an associate of the user connected with the user device. In some non-limiting embodiments or aspects, the features may be influenced by a parent of the user who updates the user account such that the user is prevented from purchasing particular types of products, such as alcohol.

Figure 2:
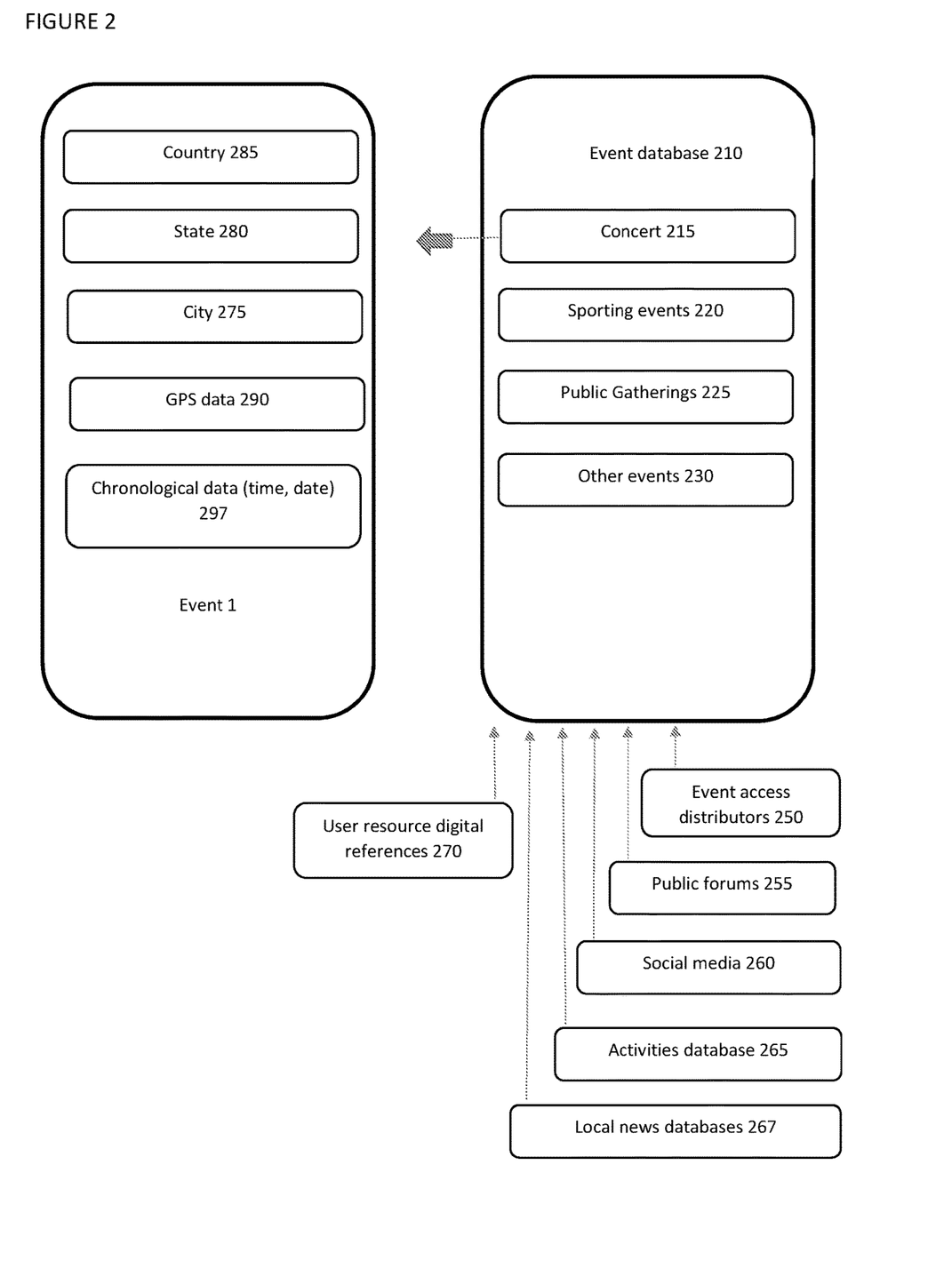
FIG. 2 is a diagram of a non-limiting embodiment or aspect or an environment that illustrates the type of data comprising and populating the event database according to some non-limiting embodiments or aspects.

In some non-limiting embodiments or aspects, and as shown in FIG. 2, the event database 210 comprises the time of occurrence and location for various events. In some non-limiting embodiments or aspects, the event database comprises specific event occurrence and location information for concerts 215, sporting events 220, public gatherings 225, or any other event 230 that a user may attend. In some non-limiting embodiments or aspects, the events listed in the database may only comprise events exceeding a certain number of attendees or events with a predicted loss of internet connectivity based on the location of the event or the number of attendees. In one non-limiting embodiment of aspect, the event data base is populated from known event access distributors (e.g., Ticketmaster®) 250, public forums 255, social media 260, activities databases (e.g., Google® Travel, Yahoo! ® Travel) 265, local news 267, or any other data repository that comprises information on event occurrences and locations. Additionally, in some non-limiting embodiments or aspects, the event database may be populated based on events associated with items in a digital wallet associated with a user resource or posted on a digital calendar associated with a user resource 270. For example, a user resource may contain digital tickets to a concert or digital flight boarding passes informing the event database of an event that the user is likely to attend. In some non-limiting embodiments or aspects, machine learning may be used to refine the database and make predictions of relevant events in which the user might participate based on the user's past travel patterns, spending activity, areas of interest, or information residing in the memory of a user resource.

In some non-limiting embodiments or aspects, the events listed in the event database or associated with event occurrence information comprise the event location and chronological information. In some non-limiting embodiments or aspects, the event location information may comprise city 275, state 280, country 285, and GPS data 290 associated with the event. In some non-limiting embodiments or aspects, the event chronological 297 information may comprise the starting time and date of the event.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

Although an overview of the present subject matter has been described with reference to specific some non-limiting embodiments or aspects, various modifications and changes may be made to these embodiments without departing from the broader scope of embodiments of the present disclosure. For example, various embodiments or features thereof may be mixed and matched or made optional by a person of ordinary skill in the art. Such embodiments of the present subject matter may be referred to herein, individually or collectively, by the term "disclosure" merely for convenience and without intending to voluntarily limit the scope of this application to any single disclosure or present concept if more than one is, in fact, disclosed.

The embodiments illustrated herein are believed to be described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A computer-implemented method for automatically updating at least one feature of a user account, comprising:
   a. determining, with at least one processor, a geographic position of a user resource associated with a user by accessing the user resource, the user resource comprising geographic data as a function of time;
   b. accessing, with the at least one processor, event data from a database of events correlated with a pre-determined geographic region and a pre-determined period of time, wherein the pre-determined geographic region comprises the geographic position of the user resource and the pre-determined period of time comprises a time corresponding to the geographic position based on the geographic data as a function of time;
   c. correlating, with the at least one processor, the geographic position of the user resource to the event data and the pre-determined period of time;
   d. calculating, with the at least one processor, using the correlated geographic position of the user resource, the event data, and the pre-determined period of time, a likelihood that the user is attending at least one event associated with the event data;
   e. in response to calculating that the likelihood exceeds a pre-determined limit, pre-authorizing, with the at least one processor, at least one off-line transaction or an aggregate off-line transaction amount during the pre-determined period of time associated with the at least one event, wherein pre-authorizing the at least one off-line transaction or the aggregate off-line transaction amount comprises:
      determining a pre-authorized off-line transaction amount and a pre-authorized number of aggregate off-line transactions based on a transaction history of the user and the event data; and
      constructing at least one API request, wherein the at least one API request comprises the pre-authorized off-line transaction amount and the pre-authorized number of aggregate off-line transactions;
   f. transmitting, with the at least one processor, the at least one API request to a service provider server;
   g. in response to the transmitting, receiving, with the at least one processor, at least one message from the service provider server, the at least one message comprising an authorization request to update at least one feature of at least one user account associated with the service provider server; and
   h. transmitting, with the at least one processor, a response to the authorization request to the service provider server authorizing the service provider server to implement the requested changes to the user account associated with the service provider server.

2. The computer-implemented method of claim 1, wherein the API request comprises updating the service provider server to set at least one off-line transaction amount limit on the at least one off-line transaction during the pre-determined period of time associated with the at least one event.

3. The computer-implemented method of claim 2, wherein the at least one message comprising the authorization request to update at least one feature of at least one user account associated with the service provider server comprises programming a digital wallet associated with the user account not to exceed the at least one off-line transaction amount limit during the pre-determined period of time associated with the at least one event.

4. The computer-implemented method of claim 2, wherein the off-line transaction amount limits are correlated with the at least one event associated with the event data.

5. The computer-implemented method of claim 1, wherein the API request comprises updating the service provider server to set limits on the number of aggregate off-line transactions associated with the aggregate off-line transaction amount during the pre-determined period of time associated with the at least one event.

6. The computer-implemented method of claim 5, wherein the at least one message comprising the authorization request to update at least one feature of at least one user account associated with the service provider server comprises programming a digital wallet associated with the user account not to exceed the number of aggregate off-line transactions associated with the aggregate off-line transaction amount during the pre-determined period of time associated with the at least one event.

7. The computer-implemented method of claim 5, wherein the number of aggregate off-line transactions associated with the aggregate off-line transaction amount is correlated with the at least one event associated with the event data.

8. A computer program product storing instructions that, when executed by one or more processors, cause the one or more processors to perform operations comprising:
   a. determining a geographic position of a user resource associated with a user by accessing the user resource, the user resource comprising geographic data as a function of time;
   b. accessing event data from a database of events correlated with a pre-determined geographic region and a pre-determined period of time, wherein the pre-determined geographic region comprises the geographic position of the user resource and the pre-determined period of time comprises a time corresponding to the geographic position based on the geographic data as a function of time;
   c. correlating the geographic position of the user resource to the event data and the pre-determined period of time;
   d. calculating using the correlated geographic position of the user resource, the event data, and the pre-determined period of time, a likelihood that the user is attending at least one event associated with the event data;
   e. in response to calculating that the likelihood exceeds a pre-determined limit, pre-authorizing at least one off-line transaction or an aggregate off-line transaction amount during the pre-determined period of time associated with the at least one event, wherein pre-authorizing the at least one off-line transaction or the aggregate off-line transaction amount comprises:
      determining a pre-authorized off-line transaction amount and a pre-authorized number of aggregate off-line transactions based on a transaction history of the user and the event data; and
      constructing at least one API request, wherein the at least one API request comprises the pre-authorized off-line transaction amount and the pre-authorized number of aggregate off-line transactions;
   f. transmitting the at least one API request to a service provider server;
   g. in response to the transmitting, receiving at least one message from the service provider server, the at least one message comprising an authorization request to update at least one feature of at least one user account associated with the service provider server; and
   h. transmitting a response to the authorization request to the service provider server authorizing the service provider server to implement the requested changes to the user account associated with the service provider server.

9. The computer program product of claim 8, wherein the API request comprises updating the service provider server to set at least one off-line transaction amount limit on the at least one off-line transaction during the pre-determined period of time associated with the at least one event.

10. The computer program product of claim 9, wherein the at least one message comprising the authorization request to update at least one feature of at least one user account associated with the service provider server comprises programming a digital wallet associated with the user account not to exceed the at least one off-line transaction amount limit during the pre-determined period of time associated with the at least one event.

11. The computer program product of claim 9, wherein the off-line transaction amount limits are correlated with the at least one event associated with the event data.

12. The computer program product of claim 8, wherein the API request comprises updating the service provider server to set limits on the number of aggregate off-line transactions associated with the aggregate off-line transaction amount during the pre-determined period of time associated with the at least one event.

13. The computer program product of claim 12, wherein the at least one message comprising the authorization request to update at least one feature of at least one user account associated with the service provider server comprises programming a digital wallet associated with the user account not to exceed the number of aggregate off-line transactions associated with the aggregate off-line transaction amount during the pre-determined period of time associated with the at least one event.

14. The computer program product of claim 12, wherein the number of aggregate off-line transactions associated with the aggregate off-line transaction amount is correlated with the at least one event associated with the event data.

15. A system comprising:
   a. one or more hardware processors; and
   b. a storage device storing instructions that, when executed by the one or more hardware processors, causes the one or more hardware processors to perform operations comprising:
      i. determining a geographic position of a user resource associated with a user by accessing the user resource, the user resource comprising geographic data as a function of time;
      ii. accessing event data from a database of events correlated with a pre-determined geographic region and a pre-determined period of time, wherein the pre-determined geographic region comprises the geographic position of the user resource and the pre-determined period of time comprises a time corresponding to the geographic position based on the geographic data as a function of time;
      iii. correlating the geographic position of the user resource to the event data and the pre-determined period of time;
      iv. calculating using the correlated geographic position of the user resource, the event data, and the pre-determined period of time, a likelihood that the user is attending at least one event associated with the event data;
      v. in response to calculating that the likelihood exceeds a pre-determined limit, pre-authorizing at least one off-line transaction or an aggregate off-line transaction amount during the pre-determined period of time associated with the at least one event, wherein pre-authorizing the at least one off-line transaction or the aggregate off-line transaction amount comprises:
         determining a pre-authorized off-line transaction amount and a pre-authorized number of aggregate off-line transactions based on a transaction history of the user and the event data; and
         constructing at least one API request, wherein the at least one API request comprises the pre-authorized off-line transaction amount and the pre-authorized number of aggregate off-line transactions;
      vi. transmitting the at least one API request to a service provider server;
      vii. in response to the transmitting, receiving at least one message from the service provider server, the at least one message comprising an authorization request to update at least one feature of at least one user account associated with the service provider server; and viii. transmitting a response to the authorization request to the service provider server authorizing the service provider server to implement the requested changes to the user account associated with the service provider server.

16. The system of claim 15, wherein the API request comprises updating the service provider server to set at least one off-line transaction amount limit on the at least one off-line transaction during the pre-determined period of time associated with the at least one event.

17. The system of claim 16, wherein the at least one message comprising the authorization request to update at least one feature of at least one user account associated with the service provider server comprises programming a digital wallet associated with the user account not to exceed the at least one off-line transaction amount limit during the pre-determined period of time associated with the at least one event.

18. The system of claim 16, wherein the off-line transaction amount limits are correlated with the at least one event associated with the event data.

19. The system of claim 15, wherein the API request comprises updating the service provider server to set limits on the number of aggregate off-line transactions associated with the aggregate off-line transaction amount during the pre-determined period of time associated with the at least one event.

20. The system of claim 19, wherein the at least one message comprising the authorization request to update at least one feature of at least one user account associated with the service provider server comprises programming a digital wallet associated with the user account not to exceed the number of aggregate off-line transactions associated with the aggregate off-line transaction amount during the pre-determined period of time associated with the at least one event.

* * * * *